(12) United States Patent
Imakita et al.

(10) Patent No.: US 9,085,199 B2
(45) Date of Patent: Jul. 21, 2015

(54) PNEUMATIC TIRE HAVING UNIDIRECTIONAL TREAD PATTERN

(75) Inventors: Takeshi Imakita, Kobe (JP); Kenji Ueda, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 1167 days.

(21) Appl. No.: 12/897,414

(22) Filed: Oct. 4, 2010

(65) Prior Publication Data

US 2011/0088821 A1   Apr. 21, 2011

(30) Foreign Application Priority Data

Oct. 15, 2009   (JP) .................. 2009-238625

(51) Int. Cl.
  *B60C 11/11*   (2006.01)
  *B60C 11/03*   (2006.01)
  *B60C 11/13*   (2006.01)

(52) U.S. Cl.
  CPC ......... *B60C 11/0302* (2013.04); *B60C 11/1315* (2013.04)

(58) Field of Classification Search
  CPC .................. B60C 11/1315; B60C 11/0302
  USPC ........................ 152/209.24, 209.28
  See application file for complete search history.

(56) References Cited

U.S. PATENT DOCUMENTS

| 4,884,607 | A | * | 12/1989 | Mori | 152/209.28 |
| 4,962,801 | A | * | 10/1990 | Tsuda | 152/209.28 |
| 5,198,047 | A | * | 3/1993 | Graas et al. | 152/209.28 |
| 6,527,024 | B1 | * | 3/2003 | Ashmore | 152/209.24 |
| 2006/0048876 | A1 | | 3/2006 | Yamane et al. | |
| 2007/0006955 | A1 | * | 1/2007 | Fukunaga | 152/209.24 |
| 2009/0218021 | A1 | * | 9/2009 | Sekoguchi et al. | 152/209.23 |

FOREIGN PATENT DOCUMENTS

| JP | 05-178019 A | * | 7/1993 |
| JP | 7-186623 A | | 7/1995 |
| JP | 3104029 B2 | * | 10/2000 |
| JP | 2002-019423 A | * | 1/2002 |
| JP | 2002-59711 A | | 2/2002 |
| JP | 2007-45233 A | | 2/2007 |
| JP | 2009-023601 A | * | 2/2009 |
| JP | 2010-105561 A | * | 5/2010 |

OTHER PUBLICATIONS

Machine translation for Japan 3104029 (no date).*
Machine translation for Japan 2002-019423 (no date).*
Machine translation for Japan 2010-105561 (no date).*
Machine translation for Japan 05-178019 (no date).*
Machine translation for Japan 2009-023601 (no date).*

* cited by examiner

*Primary Examiner* — Steven D Maki
(74) *Attorney, Agent, or Firm* — Birch, Stewart, Kolasch & Birch, LLP

(57) ABSTRACT

A pneumatic tire has tread blocks (5) each defined by an equator-side longitudinal groove (3A), a tread-edge-side longitudinal groove (3B), a heel-side transverse groove (4A) and a toe-side transverse groove (4B). The block (5) has an equator-side longitudinal wall surface (8a) having a first radially outer edge (9a) and a first radially inner edge (10a), and a tread-edge-side longitudinal wall surface (8b) having a second radially outer edge (9b) and a second radially inner edge (10b). The angle α1U of the first radially outer edge (9a), the angle α1L of the first radially inner edge (10a), the angle α2U of the second radially outer edge (9b) and the angle α2L of the second radially inner edge (10b), each with respect to the tire circumferential direction, satisfy the following four conditional expressions: (0≤α1L<α1U≤45); (0<α2L<α2U≤45); (α1L<α2L) and (α1U<α2U).

12 Claims, 7 Drawing Sheets

PNEUMATIC TIRE HAVING UNIDIRECTIONAL TREAD PATTERN

BACKGROUND OF THE INVENTION

The present invention relates to a pneumatic tire with tread blocks, more particularly to a configuration of the block capable of improving the block rigidity without sacrificing the drainage performance.

In the pneumatic tires provided in the tread portion with a block pattern formed by a plurality of blocks, the following methods have been employed in order to increase the rigidity of the blocks to thereby improve the steering stability of the tire and the wear resistance of the tread portion:

- to increase the land ratio the block pattern (namely, to form the tread grooves with narrow widths);
- to form the tread grooves with shallow depths; and/or
- to form the wall surfaces (or side walls) of the blocks with gentle slopes.

In each method, however, it is inevitable that the tread grooves' volume is decreased. Accordingly, there is a possibility that drainage of the tread grooves, specifically aquaplaning performance, is deteriorated. Thus, the block rigidity and drainage are antinomic, and it was difficult to satisfy both of them.

SUMMARY OF THE INVENTION

It is therefore, an object of the present invention to provide a pneumatic tire, in which the block rigidity is increased to improve the steering stability, without sacrificing the drainage or while improving the drainage.

According to the present invention, a pneumatic tire has a unidirectional tread pattern and comprises a tread portion (2) provided on each side of the tire equator (C) with a plurality of blocks (5), each defined by
an equator-side longitudinal groove (3A),
a tread-edge-side longitudinal groove (3B),
a heel-side transverse groove (4A), and
a toe-side transverse groove (4B) to have
an equator-side longitudinal wall surface (8a) with a first radially outer edge (9a) and a first radially inner edge (10a),
a tread-edge-side longitudinal wall surface (8b) with a second radially outer edge (9b) and a second radially inner edge (10b),
a heel-side transverse wall surface (8c) with a third radially outer edge (9c) and a third radially inner edge (10c),
a toe-side transverse wall surface (8d) with a fourth radially outer edge (9d) and a fourth radially inner edge (10d), and
a top surface (7), wherein
the angle $\alpha 1U$ of the first radially outer edge (9a),
the angle $\alpha 1b$ of the first radially inner edge (10a),
the angle $\alpha 2U$ of the second radially outer edge (9b) and
the angle $\alpha 2L$ of the second radially inner edge (10b),
each with respect to the tire circumferential direction, satisfy the following four conditional expressions:

$0 \leq \alpha 1L < \alpha 1U \leq 45$,  (1)

$0 < \alpha 2L < \alpha 2U \leq 45$,  (2)

$\alpha 1L < \alpha 2L$, and  (3)

$\alpha 1U < \alpha 2U$.  (4)

DESCRIPTION OF THE PREFERRED EMBODIMENTS

Embodiments of the present invention will now be described in detail in conjunction with the accompanying drawings.

According to the present invention, pneumatic tire comprises a tread portion 2 provided on each side of the tire equator C with a plurality of blocks 5 in at least one circumferential row.

Each of the blocks 5 is defined by an equator-side longitudinal groove 3A, a tread-edge-side longitudinal groove 3B, a heel-side transverse groove 4A, and a toe-side transverse groove 4B which grooves continue to surround the block 5.

The meanings of the expressions "equator-side", "tread-edge-side", "heel-side" and "toe-side" are as follows:
"equator-side": axially inside with respect to the concerned block
"tread-edge-side": axially outside with respect to the concerned block
"heel-side" and "toe-side"; one side and the other side with respect to the concerned block in one circumferential direction Thus, the equator-side longitudinal groove 3A and tread-edge-side longitudinal groove 3B are positioned on the axially inside and axially outside of the block 5, respectively.

The heel-side transverse groove 4A and toe-side transverse groove 4B are positioned on one side and the other side of the block 5, respectively, in one circumferential direction.

In addition to this type of block 5, the tread portion 2 can be provided with other blocks. Further, aside from blocks (independent tread elements), a rib (circumferentially continuous tread element) may be disposed in the tread portion.

Figure 1:
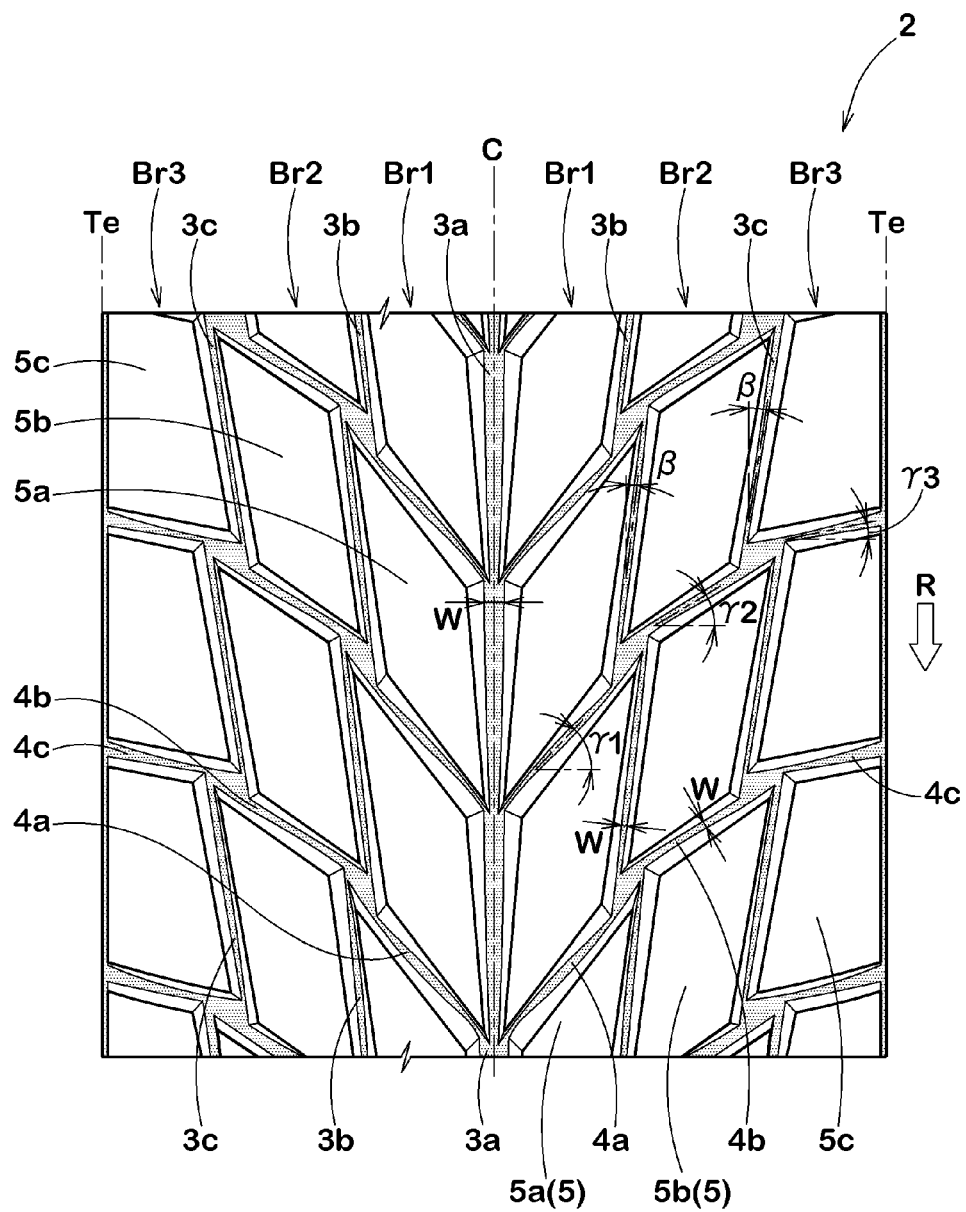
FIG. 1 is a developed partial plan view of a pneumatic tire according to the present invention showing a tread pattern.
Figure 2:
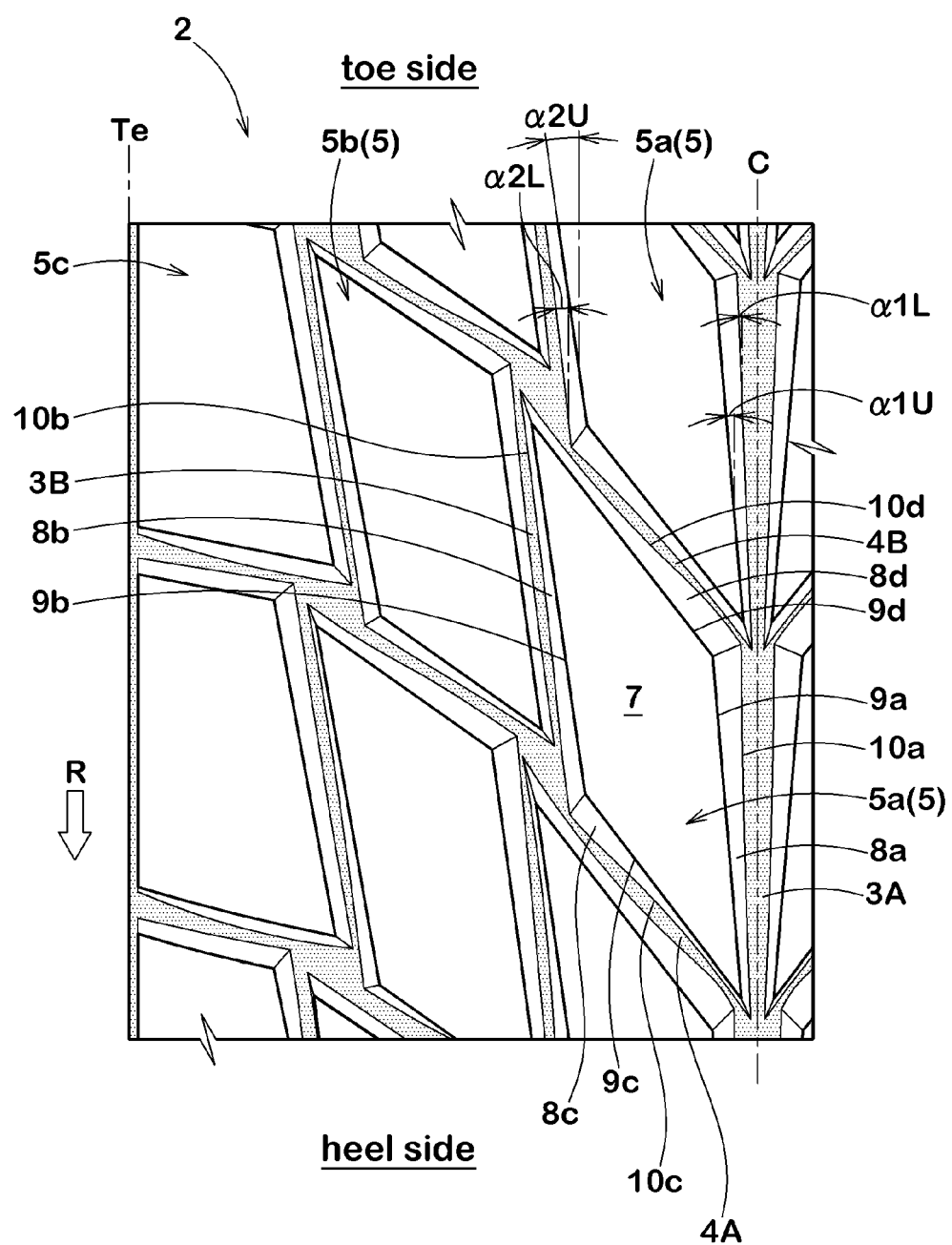
FIG. 2 is a closeup of a part of FIG. 1.

In FIG. 1 showing an embodiment of the present invention, on each side of the tire equator C, there are disposed two rows Br1, Br2 of the blocks 5 (5a, 5b), and one row Br3 of another blocks 5c. There is no rib, therefore, the tread pattern is a block pattern.

In this embodiment, the tread portion 2 is provided with tread grooves including: longitudinal grooves 3 extending in the tire circumferential direction; and transverse grooves 4 extending in the tire axial direction, and thereby the tread portion 2 is divided into the blocks 5(5a, 5b) and 5c.

In order to effectively derive drainage performance from the tread grooves, the tread pattern is formed as a unidirectional tread pattern having an intended or designed rotational direction R for the tire.

In the example of the tread pattern shown in FIG. 1, the longitudinal grooves 3 and transverse grooves 4 are arraigned substantially symmetrically about the tire equatorial line C. But, it is also possible to arrange the tread grooves 3 and 4 asymmetrically about the tire equatorial line C, for example such that the tread grooves on one side of the tire equator C are circumferentially sifted from those on the other side.

The longitudinal grooves 3 in this embodiment include: a first longitudinal groove 3a disposed along the tire equator C; and axially inner second longitudinal grooves 3b and axially outer third longitudinal grooves 3c disposed on each side of the tire equator C.

The first longitudinal groove 3a extends continuously in the tire circumferential direction.

The second longitudinal grooves 3b are inclined at a small inclination angle β with respect to the circumferential direction. The third longitudinal grooves 3c are inclined at a larger inclination angle β than that of the longitudinal grooves 3b.

The inclining directions of the second and third longitudinal grooves 3b and 3c are such that, as the tire rotates in the above mentioned direction R, each groove 3b, 3c enters into the ground contacting patch from its axially inner end to axially outer end. Thus, the drainage from the axially inside to the axially outside of the tire is promoted.

The transverse grooves 4 in this embodiment include: first transverse grooves 4a extending between the first longitudinal grooves 3a and the second longitudinal grooves 3b; second transverse grooves 4b extending between the second longitudinal grooves 3b and the third longitudinal grooves 3c; and third transverse grooves 4c extending between the third longitudinal grooves 3c and the tread edges Te.

The first, second and third transverse grooves 4a, 4b and 4c are inclined with respect to the tire axial direction at angles $\gamma 1$, $\gamma 2$ and $\gamma 3$, respectively.

Here, the angle γ is defined as that of the widthwise center line of the transverse groove at the groove bottom.

The inclining directions of the first, second and third transverse grooves 4a, 4b and 4c are such that, as the tire rotates in the above mentioned direction R, each groove 4a, 4b, 4c enters into the ground contacting patch from its axially inner end to axially outer end. Thus, the drainage from the axially inside to the axially outside of the tire is promoted.

In order for smooth drainage from the tread center to the tread edges, the axially outer end of each of the first transverse grooves 4a is positioned near the axially inner end of one of the second transverse grooves 4b, and the axially outer end of each of the second transverse grooves 4b is positioned near the axially inner end of one of the third transverse grooves 4c.

It is desirable that the transverse grooves 4 (4a, 4b, 4c) are decreased in the inclination angles $\gamma(\gamma 1, \gamma 2, \gamma 3)$ gradually from the axially inside to the axially outside of the tire (In this embodiment, $\gamma 1 > \gamma 2 > \gamma 3$).

Thereby, the water flow resistance is decreased, and the drainage from the axially inside to the axially outside is further promoted.

Further, as the block rigidity is increased gradually from the axially inside to the axially outside, the steering stability may be improved.

Preferably, the angle $\gamma 1$ of the first transverse grooves 4a is not less than 50 degrees, more preferably not less than 60 degrees. If the angle $\gamma 1$ is too large, the resistance of water flow towards the axially outside increases, therefore, the angle $\gamma 1$ is preferably not more than 80 degrees, more preferably not more than 70 degrees.

Preferably, the angle $\gamma 3$ of the third transverse grooves 4c is not more than 40 degrees, more preferably not more than 20 degrees (inclusive of 0 degree).

In the case of passenger car tires, for example, the widths W of the longitudinal grooves 3 and transverse grooves 4 are not less than 3 mm, preferably not less than 5 mm, but preferably not more than 20 mm, more preferably not more than 15 mm.

The depths D of the longitudinal grooves 3 and transverse grooves 4 are not less than 1.5 mm, preferably not less than 3 mm, but preferably not more than 8 mm, more preferably not more than 6 mm.

These values are only for example. The widths W and depths D can be changed in various ways.

By the longitudinal grooves 3 and transverse grooves 4, the tread portion 2 in this embodiment is provided on each side of the tire equator C with:
first blocks 5a defined by the first longitudinal groove 3a, the second longitudinal grooves 3b and the first transverse grooves 4a and circumferentially arranged in a rows Br1;
second blocks 5b defined by the second longitudinal grooves 3b, the third longitudinal grooves 3c and the second transverse grooves 4b and circumferentially arranged in a rows Br2; and
third blocks 5c defined by the third longitudinal grooves 3c, the tread edge Te and the third transverse grooves 4c and circumferentially arranged in a rows Br3.

Thus, in the case of the first block 5a, the equator-side longitudinal groove 3A is the first longitudinal groove 3a, the tread-edge-side longitudinal groove 3B is one of the second longitudinal grooves 3b, and the heel-side and toe-side transverse grooves 4A and 4B are two of the first transverse grooves 4a.

In the case of the second block 5b, the equator-side longitudinal groove 3A is one of the second longitudinal grooves 3b, the tread-edge-side longitudinal groove 3B is one of the third longitudinal grooves 3c, and the heel-side and toe-side transverse grooves 4A and 4B are two of the second transverse grooves 4b.

Figure 3:
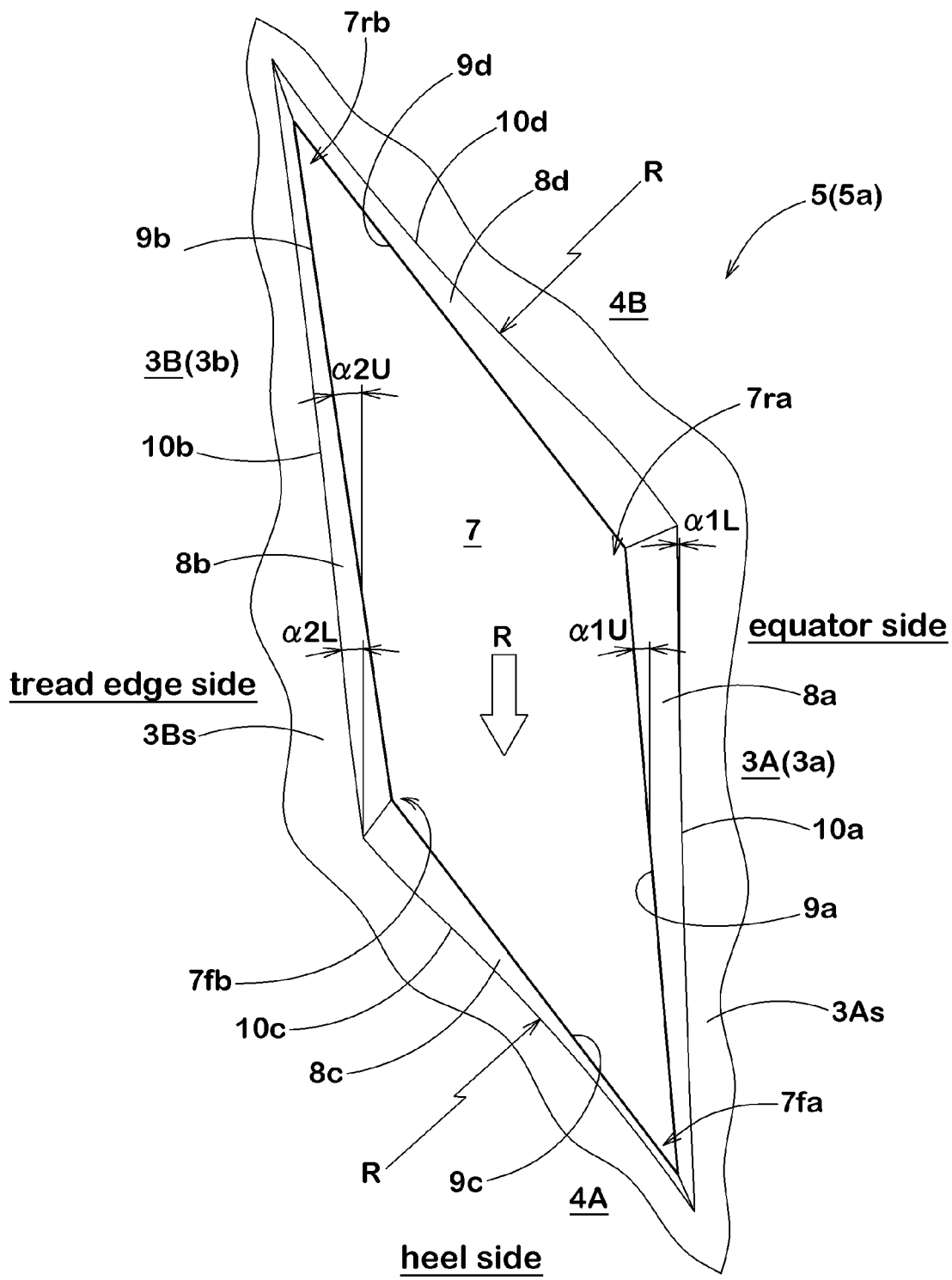
FIG. 3 is a top view of a block configured according to the present invention.
Figure 4:
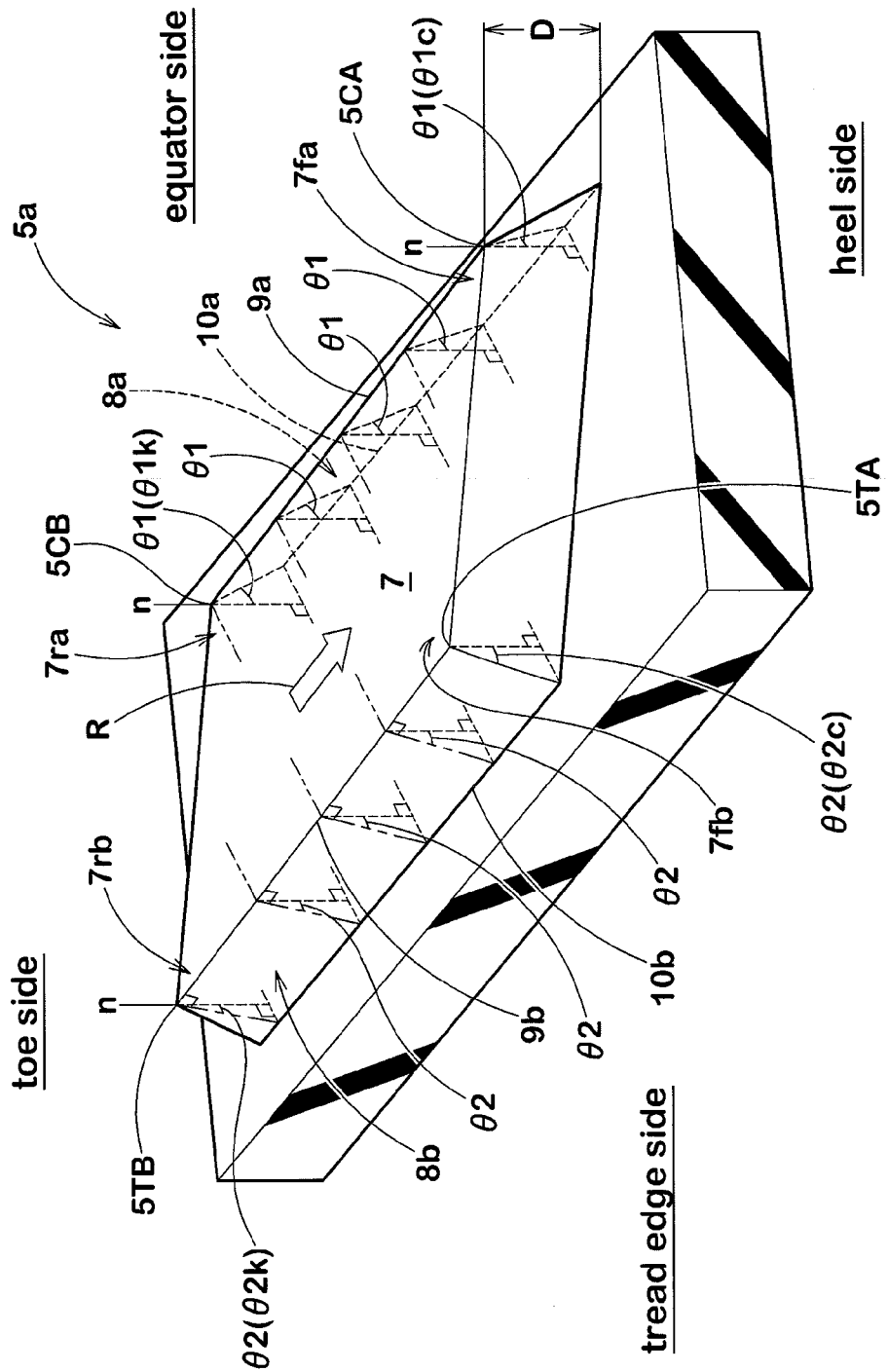
FIG. 4 is a schematic perspective view of the block.

FIGS. 3 and 4 show the first block 5a as an example of the block 5 according to the present invention.

As shown in FIG. 3, the blocks 5 has a top surface 7 contacting with the ground and four wall surfaces 8 which are:
an equator-side longitudinal wall surface 8a facing an equator-side longitudinal groove 3A,
a tread-edge-side longitudinal wall surface 8b facing a tread-edge-side longitudinal groove 3B,
a heel-side transverse wall surface 8c facing a heel-side transverse groove 4A, and
a toe-side transverse wall surface 8d facing a toe-side transverse groove 4B.

The top surface 7 in this embodiment is substantially a parallelogram in the top plan view of the block.

The equator-side longitudinal wall surface 8a has
a first radially outer edge 9a which is an intersection with the top surface 7, and
a first radially inner edge 10a which is an intersection with the groove bottom 3As of the equator-side longitudinal groove 3A. In the case that the corner between the groove bottom 3As and the equator-side longitudinal wall surface 8a is rounded or chamfered, the above mentioned first radially inner edge 10a is defined by the intersection of the equator-side longitudinal wall surface 8a with the surface of the chamfered part.

The tread-edge-side longitudinal wall surface 8b has a second radially outer edge 9b which is an intersection with the top surface 7, and
a second radially inner edge 10b which is an intersection with the groove bottom 3Bs of the tread-edge-side longitudinal groove 3B. In the case that the corner between the groove bottom 3Bs and the tread-edge-side longitudinal wall surface 8b is rounded or chamfered, the second radially inner edge 10b is defined by the intersection of the tread-edge-side longitudinal wall surface 8b with the surface of the chamfered part.

In this embodiment, the radially outer edges 9a and 9b and the radially inner edges 10a and 10b are straight lines, and on each side of the tire equator C, such straight lines are inclined to the tread edge Te on the same side, towards the toe side. The present invention is however, not limited to such arrangement.

The blocks 5 are formed to satisfy the following conditional expressions (1) and (2):

$$0 \leq \alpha 1L < \alpha 1U \leq 45 \qquad (1)$$

$$0 < \alpha 2L < \alpha 2U \leq 45 \qquad (2)$$

wherein
$\alpha 1U$ is the angle of the first radially outer edge 9a,
$\alpha 1L$ is the angle of the first radially inner edge 10a,
$\alpha 2U$ is the angle of the second radially outer edge 9b, and
$\alpha 2L$ is the angle of the second radially inner edge 10b,
each with respect to the tire circumferential direction.

As explained above, in both of the equator-side longitudinal wall surface 8a and the tread-edge-side longitudinal wall surface 8b, in comparison with the radially outer edges 9a and 9b, the radially inner edges 10a and 10b extend at shallower angles with respect to the tire circumferential direction.

Such configuration of the longitudinal wall surfaces can decrease the water flow resistance near the groove bottom in the equator-side longitudinal groove 3A and the tread-edge-side longitudinal groove 3B, and thereby the drainage is improved.

In the top plan view of the block, the paired radially outer and inner edges 9 and 10 are intersect at a position outside the block.

In this embodiment, the height D of the block from each of the groove bottom surrounding the block is constant.

Each of the longitudinal wall surfaces 8a and 8b is formed by a twisted curved surface.

As to the slope or inclination in the groove's depthwise direction or tire radial direction,
the equator-side block sidewall face 8a becomes larger inclination angle, namely, gentler slope towards the toe side, but the tread-edge-side block sidewall face 8b becomes larger inclination angle, namely, gentler slope towards the heel side.

More specifically, as shown in FIG. 4,
the first wall-surface slope angle θ1 formed between the equator-side longitudinal wall surface 8a and a normal line (n) drawn to the top surface 7 at the first radially outer edge 9a in a cross section of the block perpendicular to the first radially outer edge 9a is gradually increased from the heel side to the toe side along the first radially outer edge 9a.

The second wall-surface slope angle θ2 formed between the tread-edge-side longitudinal wall surface 8b and a normal line (n) drawn to the top surface 7 at the second radially outer edge 9b in a cross section of the block perpendicular to the second radially outer edge 9b is gradually increased from the toe side to the heel side along the second radially outer edge 9b.

As a result, an equator-side part of the block is increased in the bending rigidity gradually towards the toe side, and a tread-edge side part of the block is increased in the bending rigidity gradually towards the heel side. Therefore, the block rigidity is increased to improve the steering stability without deteriorating the drainage.

In view of the water flow resistance, it is desirable that the radially outer edges 9a and 9b and radially inner edges 10a and 10b are formed as straight lines. But, various nonlinear lines may be employed. For example, in order that the volume of the longitudinal grooves 3A and 3B is increased while preventing the land ratio from decreasing, the radially inner edges 10a and 10b can be formed as a curved line of which central portion slightly dents towards the inside of the block like a circular arc.

In order to effectively derive the function to improve the drainage, the angle $\alpha 1L$ of the first radially inner edge 10a with respect to the tire circumferential direction is set to be more than 0 degree. Further, it is desirable from a point of view of the block rigidity that the angle $\alpha 1L$ is set to be 5 degrees or more.

The angle $\alpha 1U$ of the first radially outer edge 9a with respect to the tire circumferential direction is set to be more than the angle $\alpha 1L$.

If the angle $\alpha 1U$ is excessively increased, the top surface 7 of the block 5 becomes small and the land ratio decreases, therefor, there is a possibility that the block rigidity decreases and the steering stability deteriorates.

From this standpoint, the angle $\alpha 1U$ of the first radially outer edge 9a with respect to the tire circumferential direction is set to be not more than 45 degrees. Preferably, the angle $\alpha 1U$ is not more than 30 degrees.

As described above, in the equator-side longitudinal wall surface 8a, the difference between the angle $\alpha 1U$ of the first radially outer edge 9a and the angle $\alpha 1L$ of the first radially inner edge 10a can increase the block rigidity. Therefore, if the angle difference $\alpha 1U-\alpha 1L$ becomes small, this effect relatively decreases.

On the other hand, if the angle difference $\alpha 1U-\alpha 1L$ becomes large, the variation of the block rigidity in the tire circumferential direction increases, and as a result, uneven wear is liable to occur in the low-rigidity part of the block. From this standpoint, it is desirable that the angle difference $\alpha 1U-\alpha 1L$ is set in a range of not less than 5 degrees, but not more than 15 degrees.

The angle $\alpha 2L$ of the second radially inner edge 10b with respect to the tire circumferential direction is set to be more than 0 degree. It is desirable from a point of view of the block rigidity that the angle $\alpha 2L$ is not less than 10 degrees.

The angle $\alpha 2U$ of the second radially outer edge 9b with respect to the tire circumferential direction is set to be more than the angle $\alpha 2L$. However, if the angle $\alpha 2U$ becomes excessively increased, the top surface 7 of the block is decreased in the area and the land ratio is decreased, therefore the block rigidity is decreased, and the steering stability is deteriorated.

From this standpoint, the angle $\alpha 2U$ of the second radially outer edge 9b with respect to the tire circumferential direction is set to be not more than 45 degrees, more preferably not more than 35 degrees.

If the difference $\alpha 2U-\alpha 2L$ between the angle $\alpha 2U$ of the second radially outer edge 9b and the angle $\alpha 2L$ of the second radially inner edge 10b becomes small, the effect to improve the block rigidity tends to relatively decrease.

On the other hand, if the angle difference $\alpha 2U-\alpha 2L$ becomes large, uneven wear tends to occur.

From this standpoint, it is desirable that the angle difference $\alpha 2U-\alpha 2L$ is not less than 5 degrees, but not more than 15 degrees.

Further, the angles $\alpha 1L$, $\alpha 2L$, $\alpha 1U$ and $\alpha 2U$ satisfy the following conditional expressions (3) and (4):

$$\alpha 1L < \alpha 2L \qquad (3)$$

$$\alpha 1U < \alpha 2U \qquad (4)$$

In other words, the first radially outer edge 9a and the first radially inner edge 10a of the equator-side longitudinal wall surface 8a extend in directions closer to the tire circumferential direction in comparison with the second radially outer edge 9b and the second radially inner edge 10b of the tread-edge-side longitudinal wall surface 8b.

Thereby, the water flow resistance of the equator-side longitudinal groove 3A is further decreased to facilitate the drainage on the tire equator side.

Further, by the above described angle limitations, a tread-edge-side part of the block is increased in the rigidity, and the steering stability is improved.

In order to achieve the drainage and steering stability in a well-balanced manner, the above-mentioned angle differences α2L-α1L and α2U-α1U are preferably set in a range of not less than 5 degrees but not more than 20 degrees.

Further, as to the first wall-surface slope angle θ1 and the second wall-surface slope angle θ2, if the angles θ1 and θ2 are too large, there is a possibility that the steering stability is deteriorated due to decrease in the land ratio. If the angles θ1 and θ2 are too small, it becomes difficult to increase the block rigidity.

From this standpoint, the first wall-surface slope angle θ1 is preferably not less than 10 degrees, but not more than 45 degrees.

The second wall-surface slope angle θ2 is preferably not less than 10 degrees, but not more than 45 degrees.

In order to achieve the drainage and steering stability in a well-balanced manner, it is desirable that, in the equator-side longitudinal wall surface 8a, the angle difference θ1k-θ1c between the first wall-surface slope angle θ1c at the heel-side end 5CA and the first wall-surface slope angle θ1k at the toe-side end 5CB is set in a range of not less than 2 degrees, more preferably not less than 5 degrees, but not more than 45 degrees, more preferably not more than 20 degrees.

Similarly, it is desirable that, in the tread-edge-side longitudinal wall surface 8b, the angle difference θ2c-θ2k between the second wall-surface slope angle θ2c at the heel-side end 5TA and the second wall-surface slope angle θ2k at the toe-side end 5TB is set in a range of not less than 2 degrees, more preferably not less than 5 degrees, but not more than 45 degrees, more preferably not more than 20 degrees.

Further, it is desirable that the first wall-surface slope angle θ1c at the heel-side end 5CA is less than the second wall-surface slope angle θ2k at the toe-side end 5TB, Preferably, the difference θ2k-θ1c is set in a range of less than 5 degrees, but not more than 30 degrees.

Figure 5:
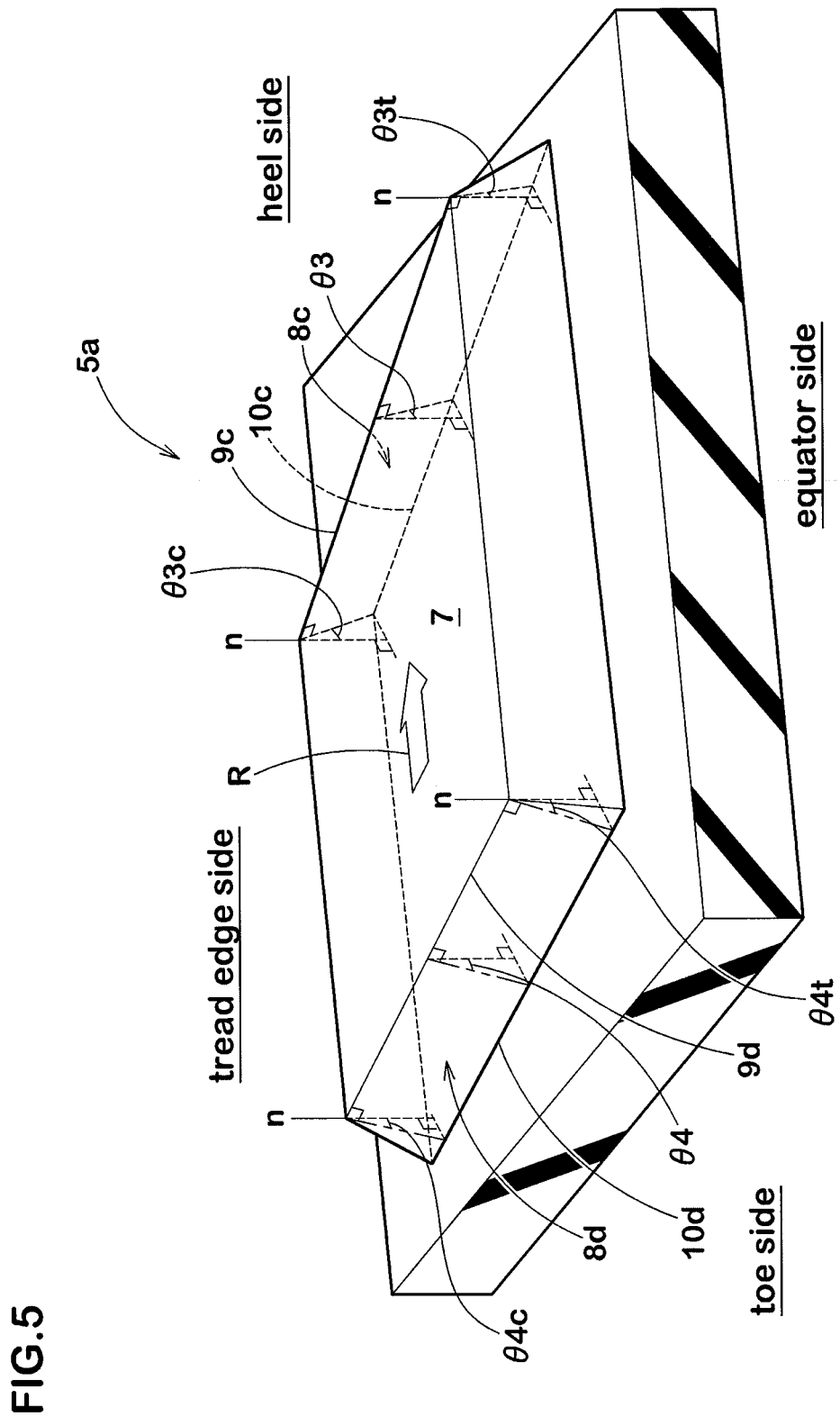
FIG. 5 is a schematic perspective view of the block from different angle.

As shown in FIG. 5, the heel-side transverse wall surface 8c has:
a third radially outer edge 9c which is an intersection with the top surface 7; and
a third radially inner edge 10c which is an intersection with the groove bottom of the heel-side transverse groove 4A.

The toe-side transverse wall surface 8d has
a fourth radially outer edge 9d which is an intersection with the top surface 7 and
a fourth radially inner edge 10d which is an intersection with the groove bottom of the toe-side transverse groove 4B.

In the case that the corner between the groove bottom and transverse wall surface 8c, 8d is rounded or chamfered, the radially inner edge 10c, 10d is defined by the intersection of the transverse wall surface 8c, 8d with the surface of the chamfered part.

In this embodiment, further, the third wall-surface slope angle θ3 formed between the heel-side transverse wall surface 8c and a normal line (n) drawn to the top surface 7 at the third radially outer edge 9c in a cross section of the block perpendicular to the third radially outer edge 9c is gradually increased from the tire equator side to the tread edge side along the third radially outer edge 9c.

Furthermore, the fourth wall-surface slope angle θ4 formed between the toe-side transverse wall surface 8d and a normal line (n) drawn to the top surface 7 at the fourth radially outer edge 9d in a cross section of the block perpendicular to the fourth radially outer edge 9d is gradually increased from the tread edge side to the tire equator side. Thereby, in cooperation with the above described configurations of the equator-side longitudinal wall surface 8a and tread-edge-side longitudinal wall surface 8b, the drainage and block rigidity can be further improved.

In this embodiment, the third radially inner edge 10c and fourth radially inner edge 10d are formed as a curved line of which central portion slightly dents towards the inside of the block like a circular arc. Thereby, the transverse grooves 4A, 4B are partially increased in the groove volume, and the drainage can be improved while preventing the decrease in the land ratio.

Figure 6:
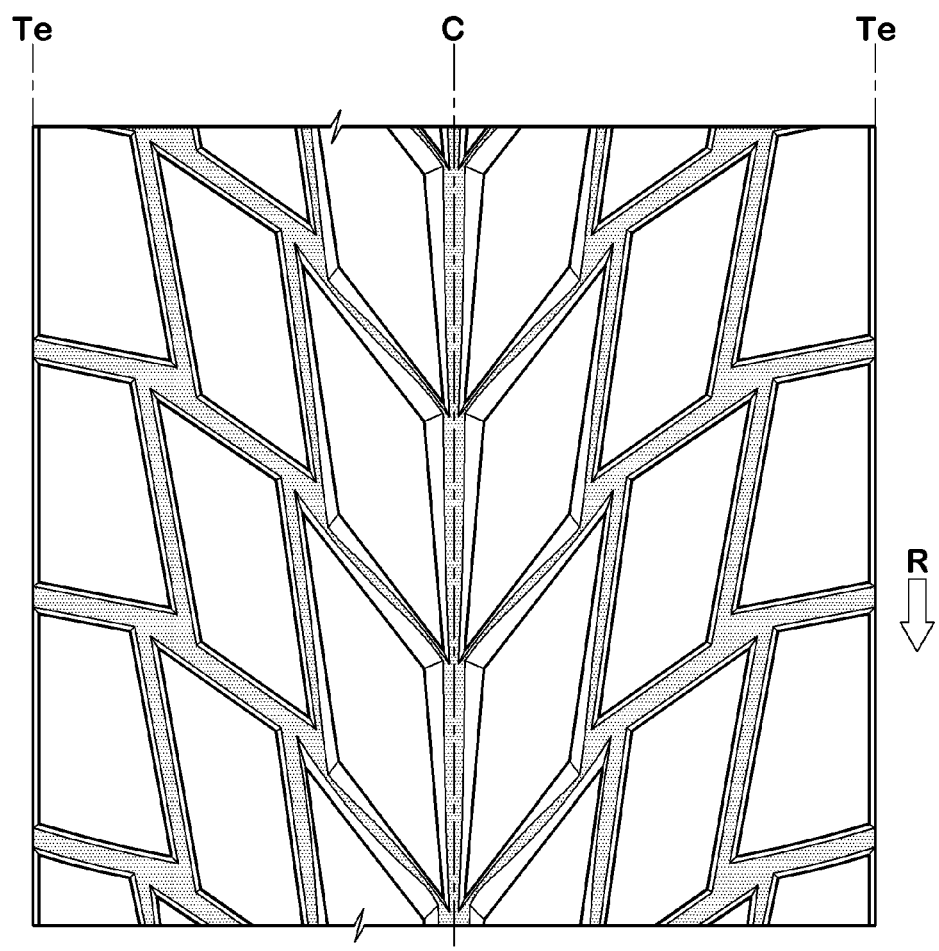
FIG. 6 is a developed partial plan view of a pneumatic tire according to the present invention showing a tread pattern which is a modification of that shown in FIG. 1.

As having been explained, in the embodiment shown in FIG. 1, the blocks 5 configured according to the present invention are arranged in four circumferential rows (Br2, Br1, Br1, Br2) of the blocks 5a and 5b. However, the blocks 5 can be arranged in two circumferential rows, for example as shown in FIG. 6, as the above-mentioned tow rows Br1 of the first blocks 5a.

Comparison Tests

Test tires provided with tread patterns based on that of FIG. 1 and having specifications shown in Table 1 were prepared and tested for the drainage performance and wear resistance.

Common specifications are as follows:

tire size: 205/55R16 groove width W: 4 to 8 mm groove depth D: 7.5 to 8.5 mm land ratio: 65% (Ref.1)

angle γ1: 50 degrees angle γ2: 35 degrees angle γ3: 20 degrees

Drainage Performance Test:

Japanese-made 4WD passenger car of 3500 cc displacement provided on all of the four wheels with test tires inflated to 230 KPa was prepared as a test car. The test car was run along a 100 meter radius circle on an asphalt road partially provided with a 10 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on Ref.1 being 100, wherein the larger the value, the better the drainage performance.

Uneven Wear Resistance Test (Block Rigidity Test):

The test car was run on the dry asphalt road for 3000 km running. Then, with respect to each of three blocks, the difference between the maximum wear amount and minimum wear amount was measured, and the average of three values of the difference was obtained. The results are indicated in Table 1 by an index based on Ref.1 being 100, wherein the larger value indicates the higher uneven wear resistance, namely, the higher block rigidity.

TABLE 1

Figure 7:
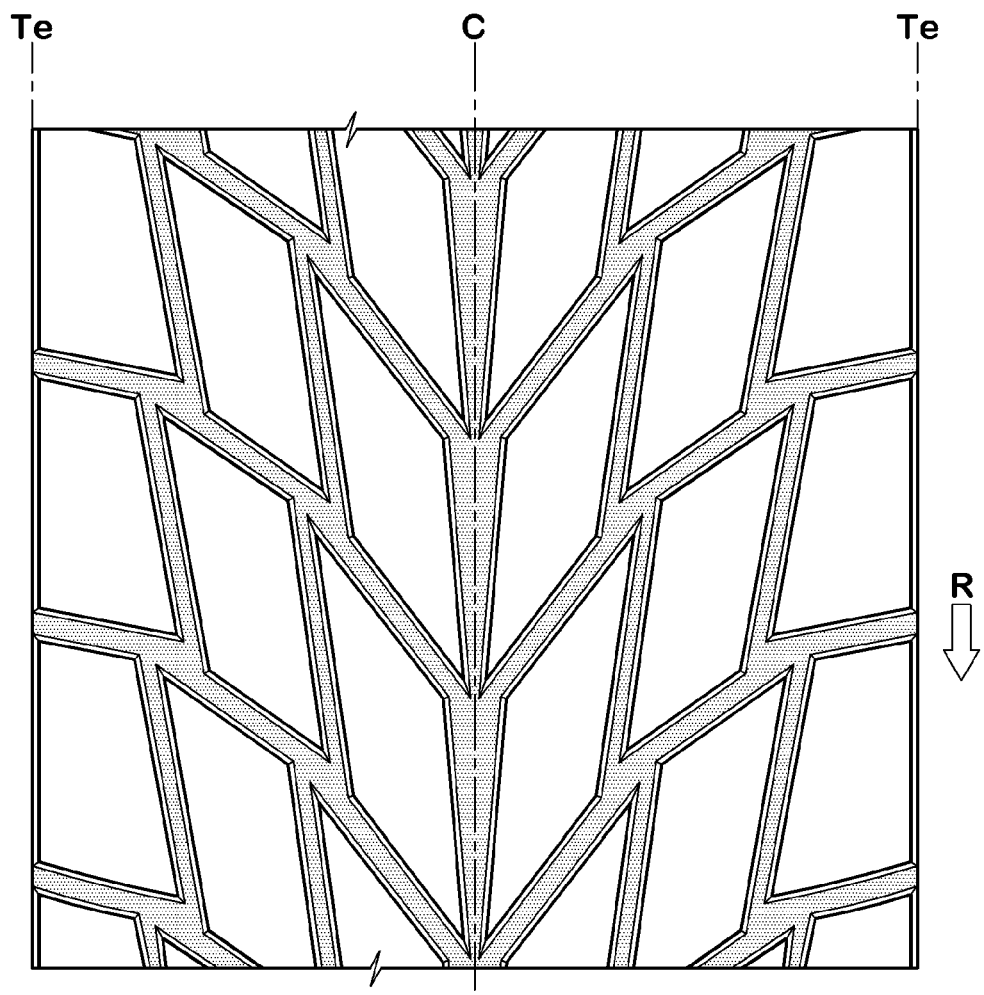
FIG. 7 is a developed partial plan view similar to FIGS. 1 and 6, showing a tread pattern used in the undermentioned comparison tests.

| | Tire | | | | | | | | |
|---|---|---|---|---|---|---|---|---|---|
| | Ref. 1 | Ref. 2 | Ref. 3 | Ref. 4 | Ex. 1 | Ex. 2 | Ex. 3 | Ex. 4 | Ex. 5 |
| Tread pattern | FIG. 7 | FIG. 7 | FIG. 7 | FIG. 7 | FIG. 6 | FIG. 1 | FIG. 1 | FIG. 1 | FIG. 1 |
| Land ratio*1 (%) | 100 | 110 | 90 | 100 | 100 | 100 | 100 | 100 | 100 |
| Groove volume*1 (%) | 100 | 90 | 110 | 80 | 100 | 100 | 100 | 100 | 100 |
| Inclination angle | | | | | | | | | |
| α1U (deg.) | 10 | 10 | 10 | 10 | 10 | 10 | 30 | 15 | 15 |
| α1L (deg.) | 10 | 10 | 10 | 10 | 5 | 5 | 25 | 5 | 5 |
| α2L (deg.) | 15 | 15 | 15 | 15 | 10 | 10 | 30 | 15 | 15 |
| α2U (deg.) | 15 | 15 | 15 | 15 | 15 | 15 | 35 | 25 | 25 |
| Slope angle | | | | | | | | | |
| θ1k–θ1c (deg.) | 0 | 0 | 0 | 0 | 10 | 10 | 10 | 20 | 20 |
| θ2c–θ2k (deg.) | 0 | 0 | 0 | 0 | 10 | 10 | 10 | 20 | 20 |
| θ3 | const. | const. | const. | const. | const. | const. | const. | const. | variable*2 |
| θ4 | const. | const. | const. | const. | const. | const. | const. | const. | variable*3 |
| Test results | | | | | | | | | |
| Uneven wear resistance | 100 | 110 | 90 | 115 | 110 | 110 | 110 | 113 | 117 |
| Drainage performance | 100 | 95 | 110 | 90 | 102 | 105 | 100 | 103 | 104 |

*1Relative values are indicated in percent based on Ref. 1 being 100%.
*2gradually increased from tire equator-side to tread edge side
*3gradually increased from tread edge side to tire equator-side It was confirmed from the test results that the tires according to the present invention can be improved in the block rigidity and drainage performance.

While preferred embodiments of the present invention have been described using specific terms, such description is for illustrative purposes only, and it is to be understood that changes and variations may be made without departing from the spirit or scope of the following claims.

The invention claimed is:

1. A pneumatic tire having a unidirectional tread pattern comprising:

a tread portion provided on each side of a tire equator with a plurality of blocks, each said block defined by an equator-side longitudinal groove, a tread-edge-side longitudinal groove, a heel-side transverse groove, and a toe-side transverse groove, and each block comprising:

an equator-side longitudinal wall surface with a first radially outer edge and a first radially inner edge, a tread-edge-side longitudinal wall surface with a second radially outer edge and a second radially inner edge, a heel-side transverse wall surface with a third radially outer edge and a third radially inner edge, and a toe-side transverse wall surface with a fourth radially outer edge and a fourth radially inner edge, wherein the angle α1U of the first radially outer edge,
the angle α1L of the first radially inner edge,
the angle α2U of the second radially outer edge, and
the angle α2L of the second radially inner edge, each with respect to the tire circumferential direction, satisfy the following four conditional expressions:

0<α1L<α1U<45;

0<α2L<α2U<45;

α1L<α2L; and

α1U<α2U, wherein the shape of a top surface of each said block defined by the first radially outer edge, the second radially outer edge, the third radially outer edge and the fourth radially outer edge is substantially a parallelogram, wherein the first radially outer edge, the first radially inner edge, the second radially outer edge and the second radially inner edge are each formed by a straight line, and wherein the third radially inner edge and the fourth radially inner edge are each formed by a curved line of which a central portion slightly dents towards an inside of the block, and wherein the longitudinal grooves and transverse grooves are arranged substantially symmetrical about the tire equator.

2. The pneumatic tire according to claim 1, wherein a first wall-surface slope angle θ1 between the equator-side longitudinal wall surface and a line normal to the top surface measured at the first radially outer edge is gradually increased from the heel side to the toe side of the block, and wherein the second wall-surface slope angle θ2 between the tread-edge-side longitudinal wall surface and a line normal to the top surface measured at the second radially outer edge is gradually increased from the toe side to the heel side.

3. The pneumatic tire according to claim 2, wherein the difference θ1k–θ1c between the first wall-surface slope angle θ1c at the heel-side end of the equator-side longitudinal wall surface and the first wall-surface slope angle θ1k at the toe-side end of the equator-side longitudinal wall surface is 2 to 45 degrees.

4. The pneumatic tire according to claim 3, wherein the first wall-surface slope angle θ1c at the heel-side end of the equator-side longitudinal wall surface is less than the second wall-surface slope angle θ2k at the toe-side end of the tread-edge-side longitudinal wall surface.

5. The pneumatic tire according to claim 3, wherein the third wall-surface slope angle θ3 between the heel-side transverse wall surface and a line normal to the top surface of the tread portion measured at the third radially outer edge is gradually increased from the tire equator-side to the tread edge side of the block, and wherein the fourth wall-surface slope angle θ4 between the toe-side transverse wall surface and a line normal to the top surface of the tread portion measured at the fourth radially outer edge is gradually increased from the tread edge side to the tire equator-side of the block.

6. The pneumatic tire according to claim 2, wherein the difference θ2c−θ2k between the second wall-surface slope angle θ2c at the heel-side end of the tread-edge-side longitudinal wall surface and the second wall-surface slope angle θ2k at the toe-side end of the tread-edge-side longitudinal wall surface is 2 to 45 degrees.

7. The pneumatic tire according to claim 6, wherein the first wall-surface slope angle θ1c at the heel-side end of the equator-side longitudinal wall surface is less than the second wall-surface slope angle θ2k at the toe-side end of the tread-edge-side longitudinal wall surface.

8. The pneumatic tire according to claim 6, wherein the third wall-surface slope angle θ3 between the heel-side transverse wall surface and a line normal to the top surface of the tread portion measured at the third radially outer edge is gradually increased from the tire equator-side to the tread edge side of the block, and
wherein the fourth wall-surface slope angle θ4 between the toe-side transverse wall surface and a line normal to the top surface of the tread portion measured at the fourth radially outer edge is gradually increased from the tread edge side to the tire equator-side of the block.

9. The pneumatic tire according to claim 2, wherein the first wall-surface slope angle θ1c at the heel-side end of the equator-side longitudinal wall surface is less than the second wall-surface slope angle θ2k at the toe-side end of the tread-edge-side longitudinal wall surface.

10. The pneumatic tire according to claim 2, wherein the third wall-surface slope angle θ3 between the heel-side transverse wall surface and a line normal to the top surface of the tread portion measured at the third radially outer edge is gradually increased from the tire equator-side to the tread edge side of the block, and
wherein the fourth wall-surface slope angle θ4 between the toe-side transverse wall surface and a line normal to the top surface of the tread portion measured at the fourth radially outer edge is gradually increased from the tread edge side to the tire equator-side of the block.

11. The pneumatic tire according to claim 1, wherein the third wall-surface slope angle θ3 between the heel-side transverse wall surface and a line normal to the top surface of the tread portion measured at the third radially outer edge is gradually increased from the tire equator-side to the tread edge side of the block, and
wherein the fourth wall-surface slope angle θ4 between the toe-side transverse wall surface and a line normal to the top surface of the tread portion measured at the fourth radially outer edge is gradually increased from the tread edge side to the tire equator-side of the block.

12. The pneumatic tire according to claim 1, wherein said blocks are arranged in two circumferential rows on each side of the tire equator, and
wherein, on each side of the tire equator, said straight lines forming the first radially outer edge, the first radially inner edge, the second radially outer edge and the second radially inner edge of each said block, are inclined to the tread edge towards the toe side.

\* \* \* \* \*